United States Patent
Kanai et al.

[11] Patent Number: 5,371,333
[45] Date of Patent: Dec. 6, 1994

[54] STEERING WHEEL PAD WITH IMPROVED HORN SWITCH ASSEMBLY

[75] Inventors: Makoto Kanai; Michio Inoue; Junichi Mizutani; Takanori Kantoh, all of Inazawa, Japan

[73] Assignee: Toyoda Gosei Co., Ltd., Nishikasugai, Japan

[21] Appl. No.: 68,111

[22] Filed: May 27, 1993

[30] Foreign Application Priority Data
Jun. 1, 1992 [JP] Japan ................. 4-140745

[51] Int. Cl.$^5$ ............... H01H 9/00; B60R 21/16
[52] U.S. Cl. .................. 200/61.54; 200/61.55; 280/731
[58] Field of Search ............ 200/61.54, 61.55; 280/728–735; B60R 21/16, 21/20; B62D 1/04; H01H 9/00, 9/02

[56] References Cited
U.S. PATENT DOCUMENTS

| | | | |
|---|---|---|---|
| 3,819,205 | 6/1974 | Dunford et al. | 280/731 |
| 4,612,425 | 9/1986 | Kanai et al. | 200/61.55 |
| 4,714,806 | 12/1987 | Inui et al. | 200/61.55 |
| 4,934,735 | 6/1990 | Embach | 280/731 |
| 5,002,306 | 3/1991 | Hiramitsu et al. | 280/731 |
| 5,198,629 | 3/1993 | Hayashi et al. | 200/61.54 |
| 5,235,146 | 8/1993 | Suzuki | 200/61.54 |

FOREIGN PATENT DOCUMENTS
4-05171  1/1992  Japan.

Primary Examiner—J. R. Scott
Attorney, Agent, or Firm—Cushman, Darby & Cushman

[57] ABSTRACT

A steering wheel pad is provided which includes a non-conductive inner member. The pad has a pressure sensitive horn switch disposed on the inner member. The horn switch has terminals. The pad includes a non-conductive outer member covering surfaces of the inner member and the horn switch. An air bag device is accommodated in the inner member. A conductive bag support is provided with the air bag device for attaching the air bag device to the inner member. The pad has a conductive bracket and a conductive coupling member having a rod section and engaging sections at opposing ends thereof. The bracket is disposed at an outer side of the outer member. The rod section of the coupling member is inserted into bores of the bag support, inner member, terminals, outer member and bracket. The engaging sections of the coupling member contact with the bag support and bracket so that the bag support, inner member, terminals, outer member and bracket are connected with each other, and the bracket is electrically connected to the terminals.

19 Claims, 10 Drawing Sheets 5,371,333

STEERING WHEEL PAD WITH IMPROVED HORN SWITCH ASSEMBLY

BACKGROUND OF THE INVENTION

This application claims the priority of Japanese Patent Application No. 4-140745, filed Jun. 1, 1992.

1. Field of the Invention

The present invention relates to a steering wheel pad which includes an air bag device and a horn switch.

2. Description of Related Art

Japanese Unexamined Utility Model Publication No. 4-5171 discloses a conventional vehicular steering wheel pad which includes an air bag device. As shown in FIG. 13, the pad includes an inner member 51, an outer member 52, and a horn switch 53 disposed between the inner and outer members 51 and 52. An air bag device 54 is accommodated under the inner member 51. The air bag device 54 is held under the inner member 51 by means of a pair of bag supports 55 disposed on opposing sides of the steering wheel (only one shown).

In a pad 56 having the above described configuration, each bag support 55 is secured to a bracket 59 by means of rivets 58, in order to prevent each member 51, 52, 54 and 55 from moving when an air bag 57 is inflated by activation of the air bag device 54. The brackets 59 together with the horn switch 53 and the outer member 52 are secured to the inner member 51, which has high rigidity, by means of other rivets 60.

Lead wires 61 and 62 are connected to the horn switch 53 and the air bag device 54, respectively, such that the horn switch 53 and the air bag device 54 can be electrically connected to a connection leading to a battery. The lead wires 61 and 62 are passed through a space in the pad 56 and bundled together. The bundled wires 61 and 62 are inserted into a hole 63a of a metal plate 63. These wires 61 and 62 are then connected to the battery, via a slip ring or the like.

However, in the conventional configuration, assembling the pad 56 and electrically connecting the horn switch 53 should be performed separately, particularly when the electrical connection of the horn switch 53 and the lead wire 61 requires a connection via a narrow space. Therefore, the wiring operation becomes rather difficult to perform, which causes the work efficiency for assembling the pad to decrease.

SUMMARY OF THE INVENTION

Accordingly, it is a object of the present invention to provide a steering wheel pad in which the pad can be easily assembled, simultaneously with electrically connecting the horn switch, thereby improving the work efficiency for manufacturing the pad.

To achieve the foregoing and the other objects, a steering wheel pad of the present invention includes a non-conductive inner member. The pad has a pressure sensitive horn switch disposed on the inner member. The horn switch includes terminals. The pad has a non-conductive outer member covering surfaces of the inner member and the horn switch. An air bag device is accommodated in a space defined by surfaces of the inner member. A conductive bag support is provided for attaching the air bag device to the inner member. The pad has a conductive bracket and a conductive coupling member having a rod section and engaging sections at opposing ends thereof. The bracket is disposed at an outer side of the outer member. The rod section of the coupling member is inserted into the bag support, inner member, terminals, outer member and bracket. The engaging sections of the coupling member contact the bag support and bracket so that the bag support, inner member, terminals, outer member and bracket are connected to each other, thus, electrically connecting the bracket to the terminals. As a result, lead wires connecting the terminals to the horn switch are not required.

BRIEF DESCRIPTION OF THE DRAWINGS

The features of the present invention are set forth with particularity in the appended claims. The invention, together with the objects and advantages thereof, may best be understood by reference to the following description of the present embodiments together with the accompanying drawings, in which:

DETAILED DESCRIPTION OF THE PRESENTLY PREFERRED EXEMPLARY EMBODIMENTS

An embodiment of a steering wheel for use in a vehicle according to the present invention will be described with reference to FIGS. 1 through 12.

Figure 1:
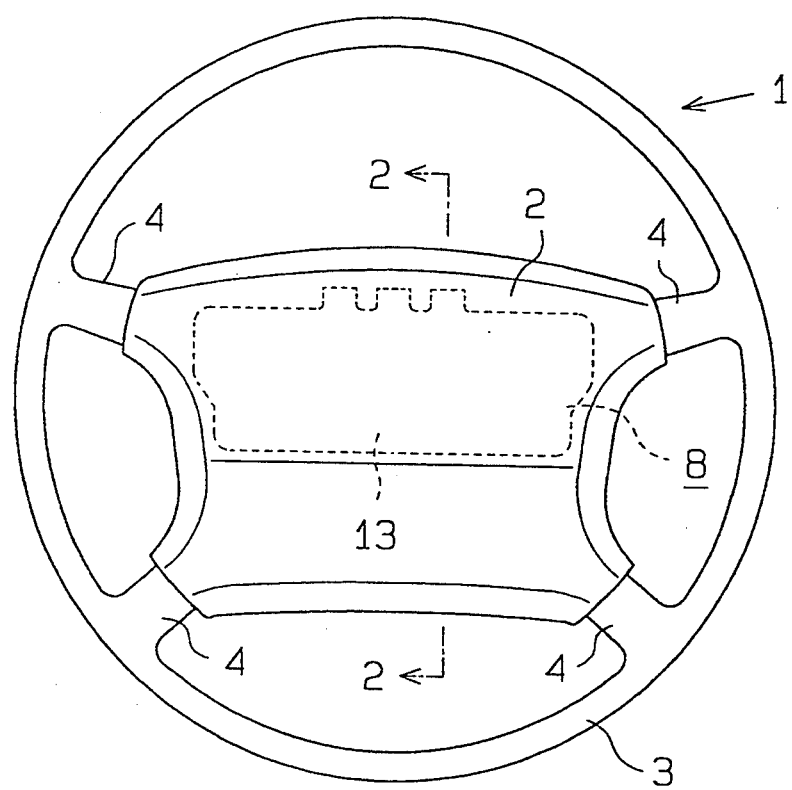
FIG. 1 is a plan view of a steering wheel pad provided in accordance with the principles of the present invention.

As shown in FIG. 1, a steering wheel 1 includes a pad 2, a ring 3, and a plurality of spokes 4. The ring 3 is disposed around the pad 2. Each spoke 4 connects the pad 2 to the ring 3.

Figure 2:
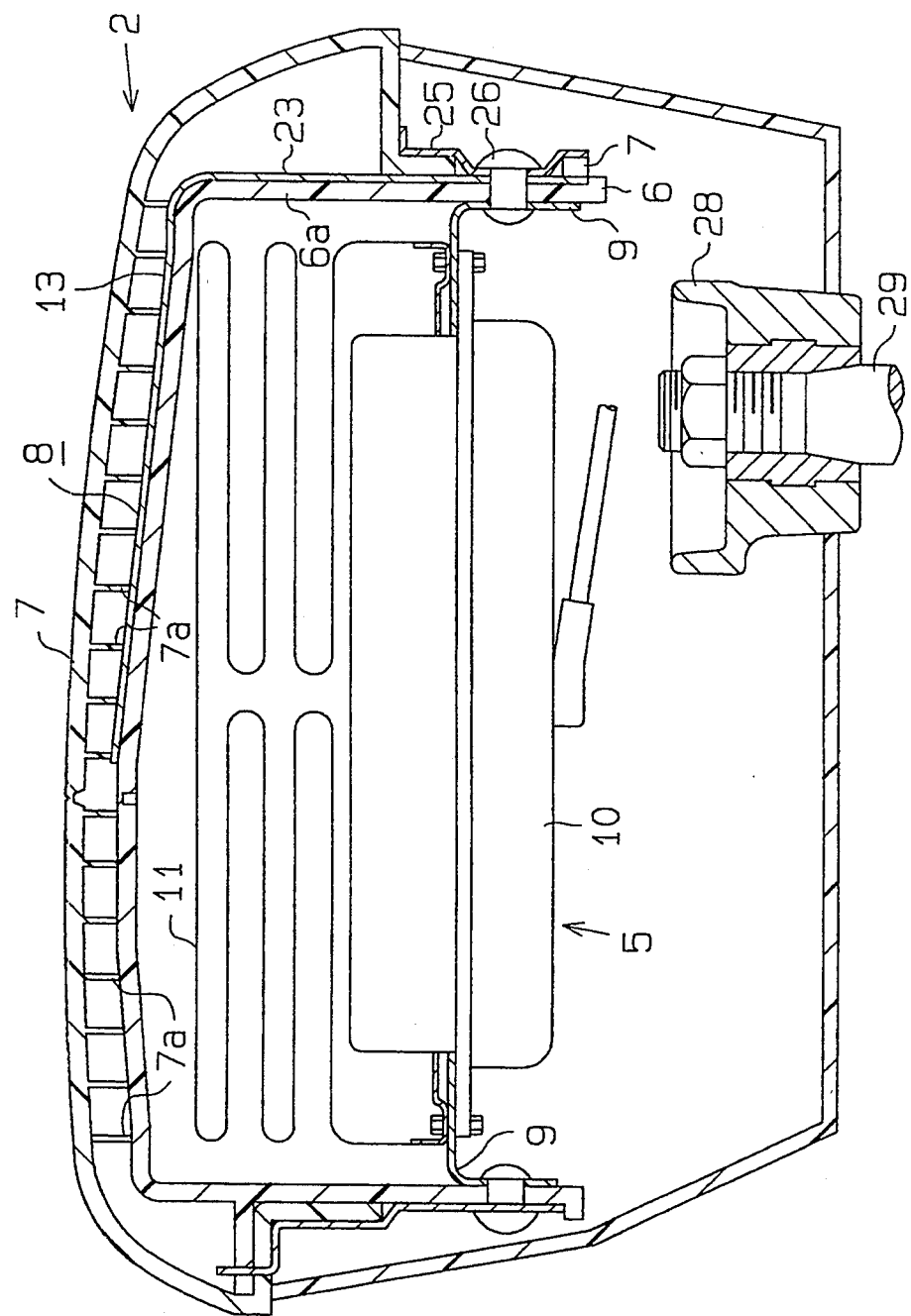
FIG. 2 is an enlarged cross-sectional view taken along line 2—2 of FIG. 1.

FIG. 2 shows an inner configuration of the pad 2. The pad 2 has an inner member 6 which accommodates an air bag device 5, an outer member 7 which is disposed over surfaces of the inner member 6, and a horn switch 8 which is disposed between the inner and outer members 6 and 7.

The air bag device 5 includes an inflater 10 and an air bag 11. The inflater 10 is secured to the bottom portion of the inner member 6, via a bag support 9. The folded air bag 11 is disposed between the inner member 6 and the inflater 10. The bag support 9 is preferably made of a conductive cold-rolled sheet steel, which has a thickness of 1 millimeter (mm). The inflater 10 includes an igniter. Nitrogen gas is generated when the igniter is actuated as a result of decomposing a gas generating agent stored in the igniter. The air bag 11 is instantly inflated by the nitrogen gas.

Figure 8:
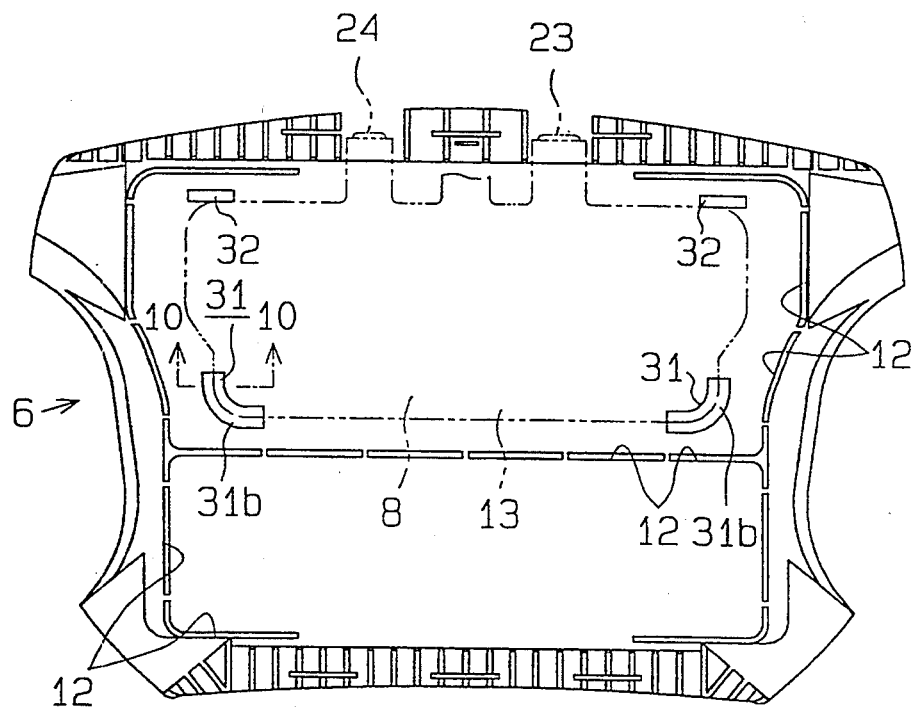
FIG. 8 is a plan view of an inner member lo of the steering wheel of FIG. 1.

The inner member 6 is preferably made of a high rigidity material, such as polyethylene terephthalate (PET), thermoplastic polyurethane (TPU) or the like, and is generally box shaped, having an open bottom surface. As shown in FIG. 8, a plurality of notches 12, which penetrate the inner member 6, are formed around the upper peripheral portion and along a substantially center line of the inner member 6 at interrupted intervals. The notches 12 form inflation lines. When the air bag 11 is inflated, the inflated air bag 11 causes the inner member 6 to be broken along the inflation lines, thus opening inner member 6.

Figure 5:
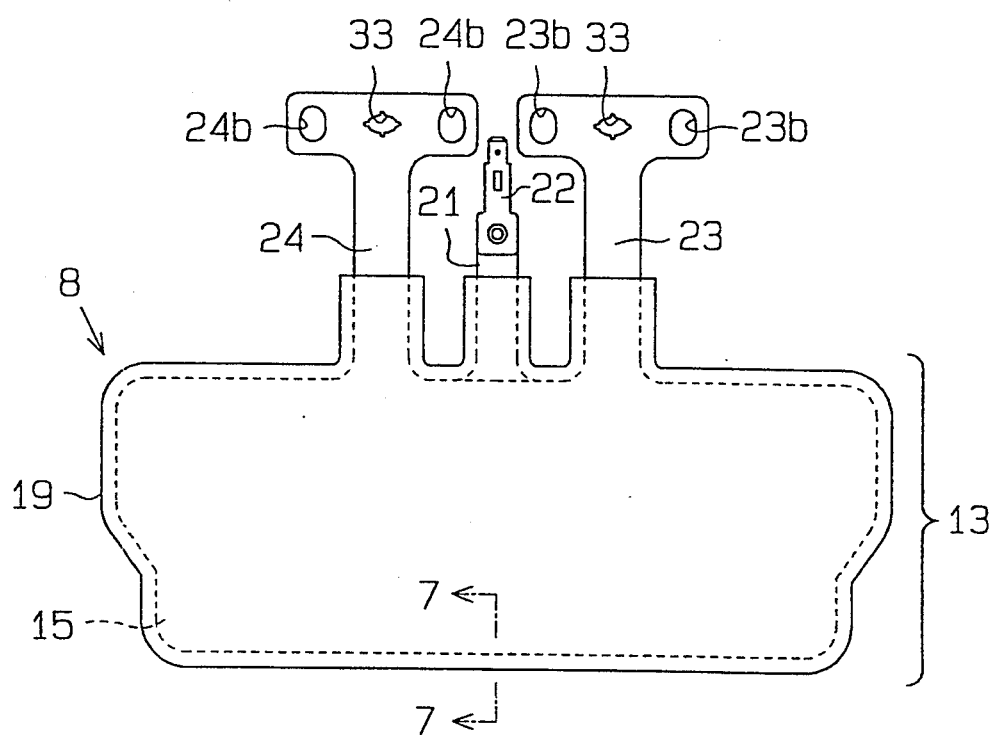
FIG. 5 is a plan view of the horn switch of the steering wheel of FIG. 1.
Figure 6:
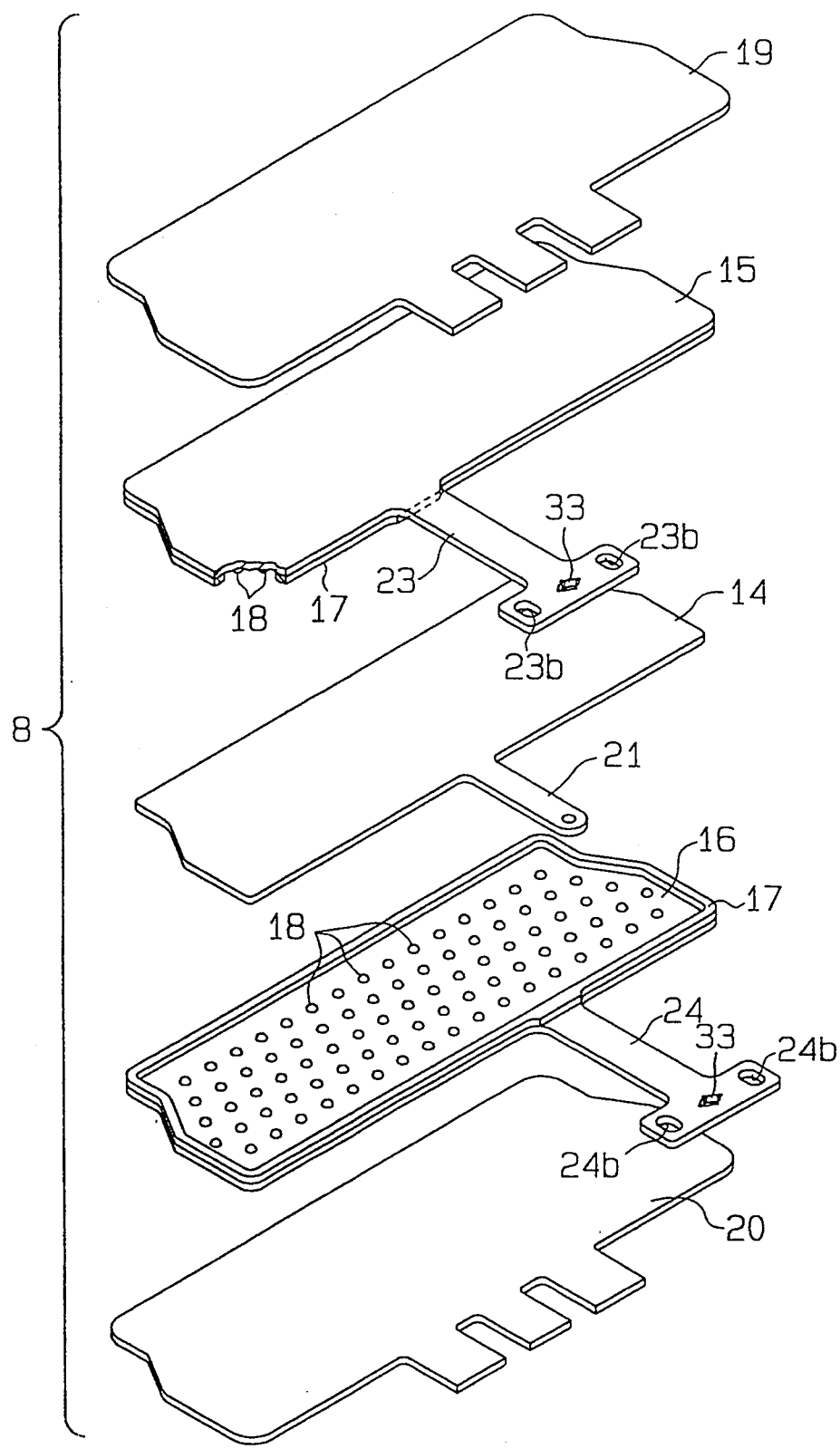
FIG. 6 is an enlarged perspective view of the disassembled horn switch of FIG. 5.
Figure 7:
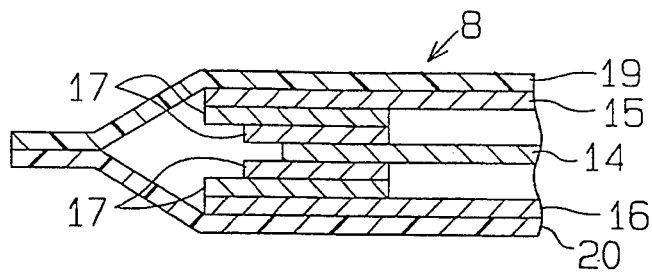
FIG. 7 is an enlarged cross-sectional view, taken along line 7—7 of FIG. 5.

As shown in FIGS. 5 and 6, the horn switch 8 includes a switch body 13, and three terminals 21, 23 and 24. The switch body 13 includes a base plate 14, a first contact plate 15, and a second contact plate 16. The plate 15 is disposed over the base plate 14, and the plate 16 is disposed under the base plate 14. The base plate 14 is a phosphor bronze plate, which has a generally rectangular shape. Both contact plates 15 and 16 are made of stainless steel, and have shapes generally similar to the shape of the base plate 14. The base plate 14 and both contact plates 15 and 16 are mounted at the upper and lower sides of the base plate 14, respectively, so as to oppose each other, via a belt shaped spacer 17 and a plurality of pellet shaped spacers 18.

The top surface of the plate 15 and the bottom surface of the plate 16 are electrically shielded by films 19 and 20 made of polyethylene terephthalate (PET) respectively. The films 19 and 20 are placed over the plates 15 and 16, respectively, and the edges of the films 15 and 16 are welded together. Therefore, the plates 15 and 16, and the base plate 14 are covered by both films 19 and 20.

When the switch body 13 is not pressed, both plates 15 and 16 are separated from the base plate 14, via the existence of the spacers 17 and 18. However, when the pellet shaped spacers 18 on the plate 15 and the pellet shaped spacers 18 on the plate 16 are disposed so as to directly oppose each other, even if pressure is applied to the outside of one of the pellet spacers 18 disposed on the plate 15, a corresponding spacers 18 disposed on the plate 16 prevents the plate 15 from being bent. Therefore, neither the first contact plate 15 nor the second contact plate 16 contacts base plate 14, thus, causing the switch to malfunction.

To prevent the above described drawback, the spacers 18 are arranged on the first plate 15 in such a way that they are offset with respect to the spacers 18 on the second plate 16. Thus, when pressure is applied to a corresponding outer position of the first plate 15 where spacers 18 on the first plate 15 are provided, the offset arrangement of spacers 18 of plate 16 and spacers 18 of plate 15 causes pressure to be transmitted to the base plate 14 via the spacers 18 on the first plate 15. Therefore, the base plate 14 is bent, so as to contact the second plate 16. On the other hand, when the pressure is applied to corresponding outer positions on the first plate 15 where spacers 18 are not provided, the first plate 15 is bent, so as to contact the base plate 14.

A base plate terminal 21 is integrally formed with the base plate 14 at a middle portion of one edge thereof. A distal portion of the terminal 21 extends from the films 19 and 20 so as to be exposed. A connector terminal 22 is secured to terminal 21 (FIG. 5).

A first contact plate terminal 23 is integrally formed with the first contact plate 15 at a position slightly displaced from the center thereof. Further, the second contact plate terminal 24 opposing terminal 23 is integrally formed with the plate 16 on the edge thereof. Substantially all of both contact terminals 23 and 24 are exposed, thus, not being covered by films 19 and 20.

As shown in FIG. 2, the switch body 13 of the horn switch 8 is disposed on the top surface of the inner member 6. Furthermore, the terminals 21, 23 and 24 are downwardly bent (toward a steering shaft 29 side of the pad 2). The base terminal 21 is electrically connected to a horn device (not shown), and the first and second terminals 23 and 24 are secured to a side wall 6a of the inner member 6.

An alternative structure may be used to attach the horn switch 8 to the inner member 6. Thus, it is possible to secure the switch body 13 to the top surface of the inner member 6 by means of an adhesive agent. However, when the room temperature of a vehicle significantly rises during summertime, under the above-described assembly being employed, the differences in coefficient of thermal expansion between the inner member 6 and each member which forms the switch body 13, may generate stress which acts on the switch body 13. The stress may cause the switch body 13 to malfunction.

To reduce stress which may cause the switch to malfunction, it is preferable that only the switch body 13, involved in the switching operation, be placed in contact with the inner member 6. The first and second terminals 23 and 24, which are not significantly involved in the switching operation, are secured to the inner member 6.

The outer member 7 is preferably made of an insulating or non-conductive soft material, such as a thermal plastic elastomer. The thermal plastic elastomer is preferably composed with hydrofined SBS block copolymer, polypropylene, oil and filler. A plurality of ribs 7a are integrally formed with the outer member 7 on the bottom surface thereof. The ribs 7a abut with the top surfaces of the inner member 6 or the top surface of the switch body 13 of the horn switch 8. When the outer member 7 is not pressed, the ribs 7a maintain the outer member 7 in a predetermined shape. When the outer member 7 is pressed, the ribs 7a transmit the pressure to the switch body 13.

The following assembly structure is employed to electrically connect the bag support 9 to both terminals 23 and 24 of the horn switch 8.

Figure 3:
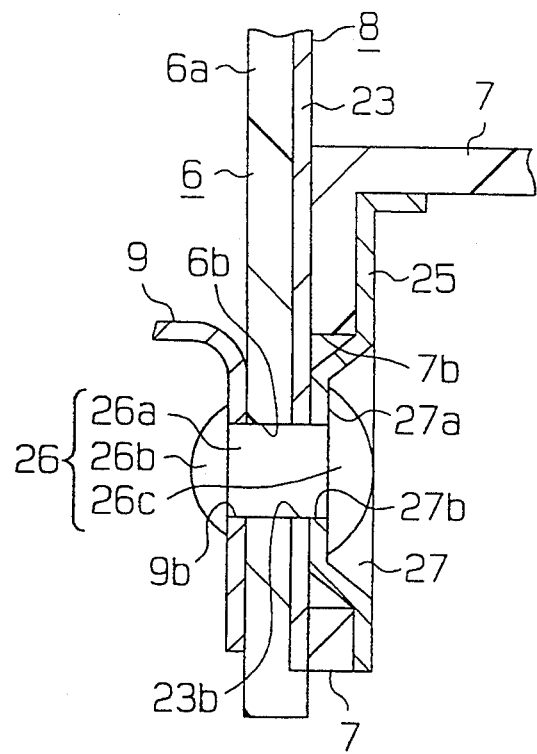
FIG. 3 is an enlarged cross-sectional view of a mounting portion of FIG. 2.
Figure 4:
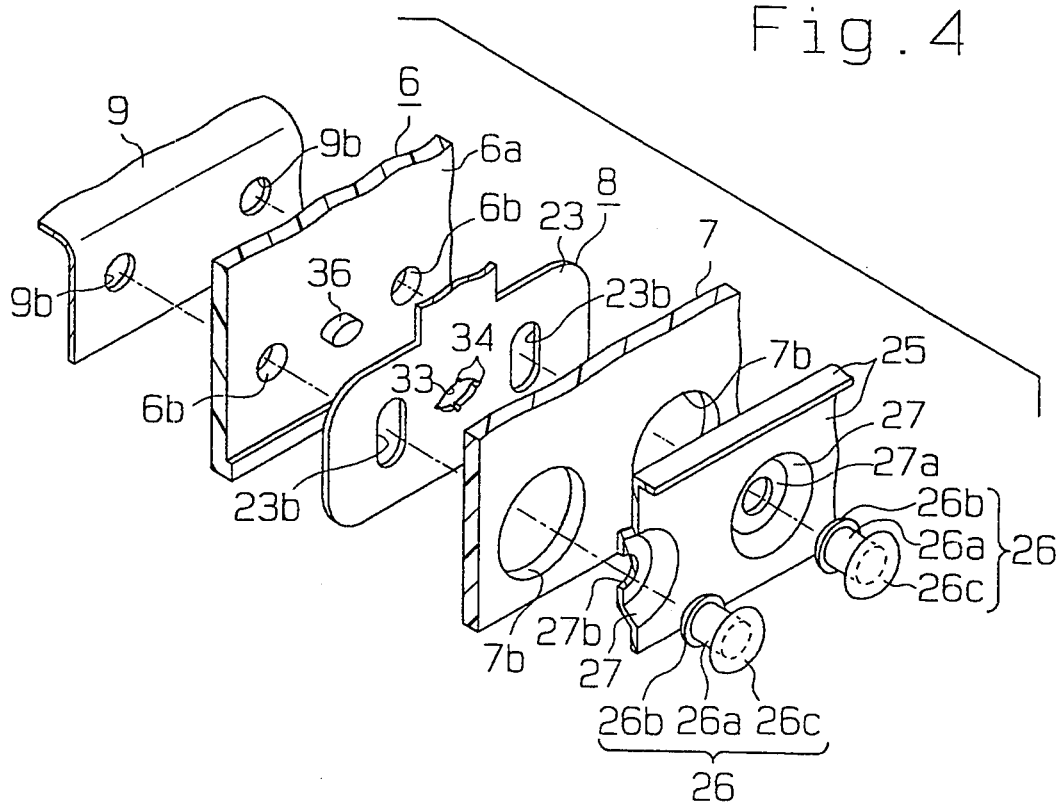
FIG. 4 is a perspective view illustrating the connection of a bag support, a horn switch and outer member, which are assembled with an inner member of the steering wheel of FIG. 1.

As shown in FIGS. 3 and 4, the assembly structure has a conductive bracket 25 and conductive rivets 26 are provided as coupling members. The bracket 25 is made of a conductive cold rolled sheet steel which has an approximately 1 millimeter (mm) thickness. The bracket 25 is formed by press working. The outer surface of the bracket 25 is galvanized. The rivet 26 includes a rod section 26a and a pair of engaging sections 26b and 26c. The engaging sections 26b and 26c are integrally formed with the rod section 26a at the opposing ends thereof. The entire rivet 26 is made of a conductive cold rolled sheet steel.

A portion of the bracket 25 projects toward the outer member 7, which forms a generally truncated cone projection 27. The height of the projection 27 is approximately equal to the thickness of the outer member 7 (in this case, approximately 2.5 millimeters). The outer diameter of the projection 27 decreases as it extends toward the horn switch 8. The diameter of the inner bottom surface of the projection 27 is slightly larger than that of the engaging section 26c of the rivet 26. Consequently, the engaging section 26c is fitted into the space within the projection 27, and abuts against the bottom surface 27a.

Bores 27b, 7b, 23b (or 24b), 6b and 9b are formed in the projection 27 of the bracket 25, the lower portion of the outer member 7, the lower portion of the terminal 23 (or 24), the inner member 6 and the bag support 9, respectively. The rod section 26a of the rivet 26 is inserted into the bores. Among these bores, the bore 7b of the outer member 7 is specifically formed larger than the remaining bores to permit the projection 27 to be inserted thereinto.

The bag support 9 is placed over the inner side of the inner member 6, such that the bores 27b, 7b, 23b (or 24b), 6b and 9b are aligned. Both contact terminals 23 and 24, the outer member 7 and the bracket 25 are sequentially placed over the outer side of the inner member 6. Under this arrangement, the projection 27 of the bracket 25 is inserted into the bore 7b of the outer member 7. The projected end of the projection 27 contacts the terminal 23 (or 24). The rod section 26a of the rivet 26 is inserted into the bores 27b, 7b, 23b (or 24b), 6b and 9b. Further, the inner engaging section 26b of the rivet 26 abuts against the bag support 9. The outer engaging section 26c of the rivet 16 abuts against the bottom surface 27a of the projection 27. Each member 9, 6, 8, and 25 is securely clamped between the engaging sections 26b and 26c of the rivet 26.

Since the assembly structure employs the rivets 26 and the bracket 25, the bag support 9 and the terminals 23 and 24 are electrically connected. The support 9, the terminals 23 and 24, and outer member 7 are secured to the inner member 6 at a single point. The bag support 9 is electrically connected to the negative terminal of a battery (not shown), via a bushing 28 and a steering shaft 29.

In the above-described configuration of the pad 2 of the steering wheel 1, when the outer member 7 is not pressed, the plates 15 and 16 of the horn switch 8 are separated from the base plate 14. Therefore, the plates are kept at a non-conductive position such that the horn device is not activated. When the outer member 7 is pressed and the predetermined pressure or load is applied to the horn switch 8, via ribs 7a, either one of the plates 15 and 16 contacts the base plate 14. Therefore, the horn switch 8 becomes conductive, and the horn device is activated.

In the above-described configuration of the pad 2, only the switch body 13 of the horn switch 8 is placed over the top surface of the inner member 6. Therefore, if care is not taken, the switch body 13 may be secured at a position offset from the predetermined mounting position when both terminals 23 and 24 are secured by rivets 26 during the assembly of the pad 2. Both terminals 23 and 24 are not previously positioned to the inner member 6 before coupling by the rivets 26. Therefore, the coupling operation, by use of the rivets, should be performed while determining the coupling position of both terminals 23 and 24 in order to align the holes 6b and 23b (24b) with each other.

According to this embodiment, the following two configurations (first and second) are employed to overcome the above-described drawbacks.

Figure 10:
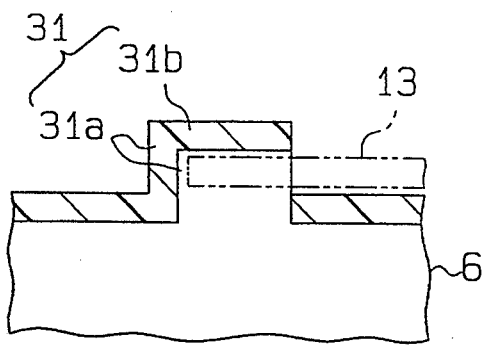
FIG. 10 is an enlarged cross-sectional view taken along line 10—10 of FIG. 8.

The first configuration, shown in FIGS. 8 and 10, includes a pair of positioning lugs 31 provided in the vicinity of the notch 12, in the central section of the top surface of the inner member 6. The lugs 31 include first sections 31a which project upwardly from the top surface of the inner member 6, and second sections 31b which are formed at the distal portions of the first sections 31a. A pair of corners of the switch body 13 can be inserted into corresponding gaps surrounded by the top surface of the inner member 6 and both the first and second sections 31a and 31b. A pair of guide lugs 32 are formed on the top surface of the inner member 6, which correspond to the positioning lugs, respectively.

Therefore, the pair of corners of the switch body 13 are inserted into the lugs 31, respectively, and one edge of the switch body 13 is abutted against the guide lugs 32. Thus, front-and-back and left-and-right movements of the switch body 13 are restricted by the first sections 31a of tile lugs 31 and the guide lugs 32. The vertical movement of the switch body 13 is restricted by the second sections 31b of the lugs 31.

Figure 9:
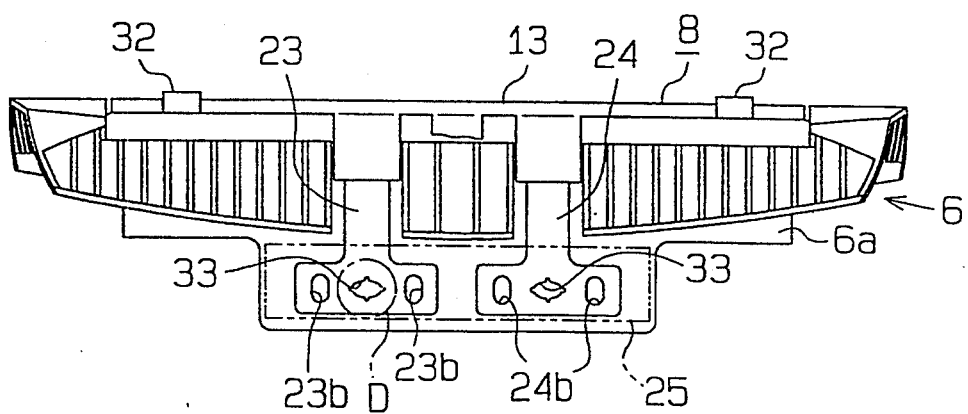
FIG. 9 is a rear view of the inner member on which the horn switch is placed.
Figure 11:
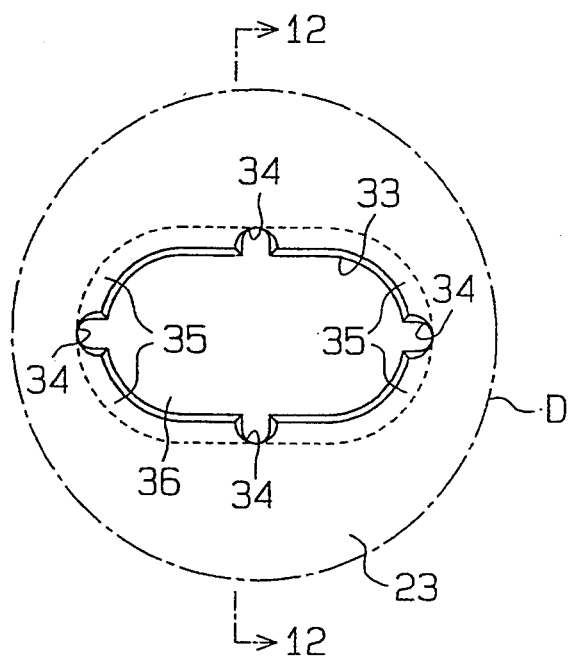
FIG. 11 is an enlarged view of the encircled portion D of FIG. 9.

The second configuration, shown in FIGS. 4, 9 and 11, includes elongated bores 33 defined at the lower portions of tile terminals 23 and 24, respectively. A plurality of notches 34 (four notches in this embodiment) are formed around each of the elongated bores 33, at predetermined intervals. The portions between the adjoining notches 34 disposed around the bores 33 (portions surrounded by a broken line in FIG. 11) constitute flexible elastic pieces 35.

A post 36, having an elongated circular cross-section and a column shape, is formed at a position which corresponds to the bore 33 on the inner member 6. The cross-sectional area of the post 36 is set slightly larger than the opening area of the bore 33.

Figure 12:
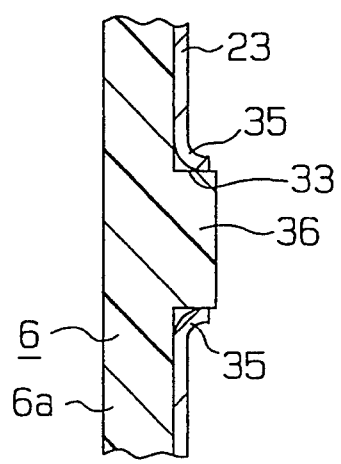
FIG. 12 is a cross-sectional view taken along line 12—12 of FIG. 11.
Figure 13:
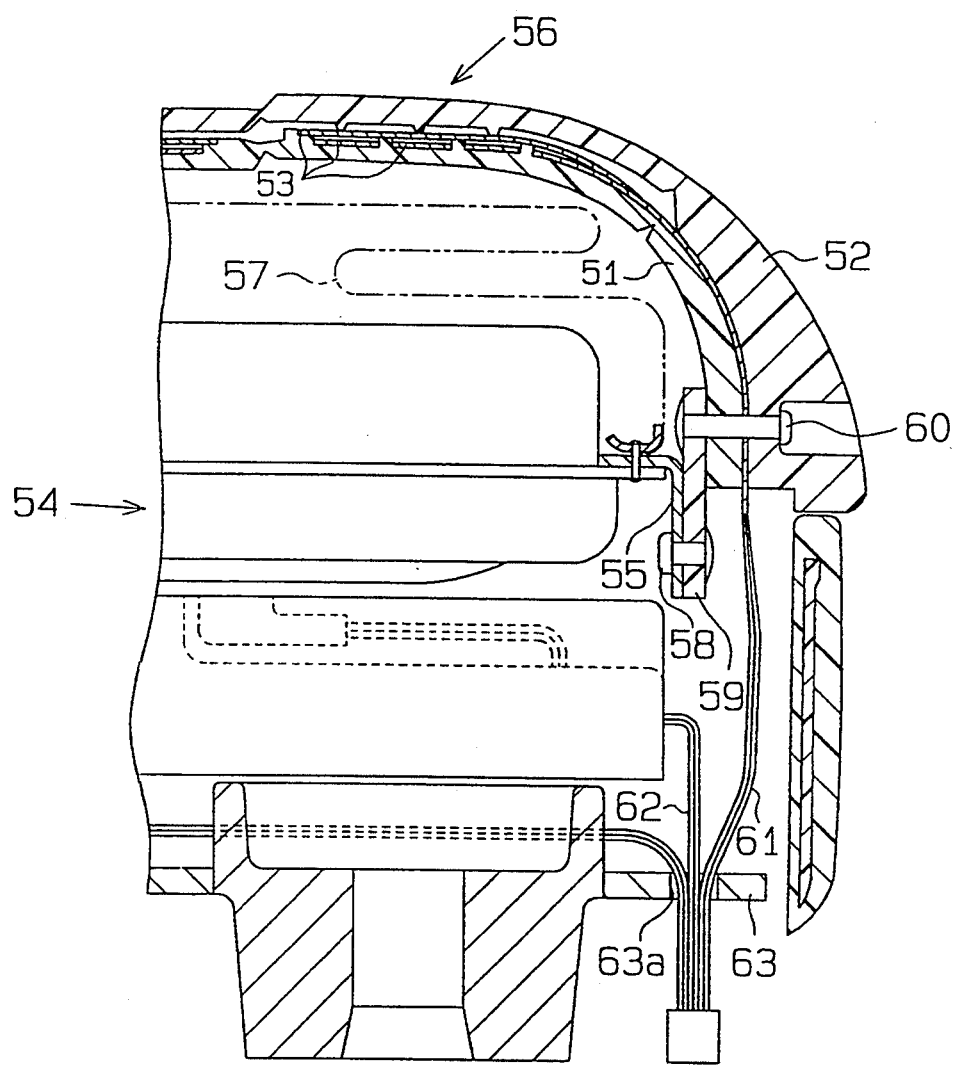
FIG. 13 is a partial cross-sectional view of a pad portion of a conventional steering wheel.

Before coupling each member by means of the rivets 26, the post 36 is fitted into the bore 33. At this time, the elastic pieces 35 are forced to deform due to the contact with the peripheral surface of the post 36, as shown in FIG. 12. Therefore, the terminals 23 and 24 are previously positioned by the post 36, and prevented from moving. Floating of the terminals 23 and 24 from the inner member 6 is also prevented. The bores 23b and 24b in the terminals 23 and 24 are securely positioned at the assigned locations, respectively. Furthermore, the cross-sectional area of the post 36 and the hole 36 is in the form of elongated circles to prevent the terminals 23 and 24 from rotating.

According to the above embodiment, before securing the horn switch 8, the switch body 13 and the terminals 23 and 24 are previously positioned, and can be maintained at the previously positioned location. During the assembling operation of the pad 2, when the coupling operation by means of the rivets 26 is performed, the switch body 13 can be prevented from moving during assembly. Therefore, before the coupling operation by the rivets 26, a previously performed positioning operation for the terminals 23 and 24 is no longer required, thus improving work efficiency of assembly. Further, thermal deformation is avoided, which occurs when the switch body 13 is secured to the top surface of the inner member 13 by the adhesive agent.

The operation and advantages according to this embodiment will now be described.

As shown in FIG. 3, the engaging section 26b of the rivet 26 abuts against the inner surface of the bag support 9, and the engaging section 26c abuts against the outer surface of bracket 25. The rod section 26a of the rivet 26 is inserted into the bores 9b, 6b, 23b (or 24b), 7b and 27b of the bag support 9, inner member 6, contact terminal 23 (24), outer member 7 and bracket 25, respectively. The rod section 26a connects the engaging sections 26b and 26c. Therefore, the bag support 9, inner member 6, contact terminals 23 and 24, outer member 7 and bracket 25 are secured together by rivets 26.

Further, the non-conductive inner member 6 is disposed between the contact terminals 23 and 24 of the horn switch 8 and the bag support 9. However, in this embodiment, the terminals 23 and 24 are electrically connected to the bag support 9 via the bracket 25 and the rivets 26, regardless of the inner member 6. This electrical connection eliminates lead wires connected to the terminals 23 and 24 of the horn switch 8. Although, a lead wire electrically connected between the air bag device 5 and the vehicle body side of the pad is still required, the wiring is easily facilitated in comparison with the prior art device.

As mentioned above, the electrical connection between the bag support 9 of the air bag device 5 and the horn switch 8 can be simultaneously executed with the assembling operation of the pad 2. Therefore, the work efficiency for assembling the pad can be improved.

Furthermore, according to this embodiment, the length of the rod section 26a of the rivet 26 can be shortened for the following reasons.

In the connecting structure employing the rivets 26 and the bracket 25, it can be appreciated that the size of the bore 7b of the outer member 7 can be made equal in size to bores 6b and 9b, and that the bracket 25 can be made flat, without the projection formed thereon. However, in such configuration, the terminals 23 and 24 and the bracket 25 are positioned apart. Therefore, the terminals 23 and 24 and the bracket 25 should be electrically connected (e.g., by lead wires). It is unavoidable that the length of the rod section 26a of the rivet 26 may be equal to the cumulative thickness of the bag support 9, inner member 6, terminals 23 and 24, outer member 7 and bracket 25.

As an alternative to the above configuration, the projections 27 may be formed on the bracket 25. The bore 7b of the outer member 7 is then slightly larger than the other bores 6b and 9b. The distal portions of the projections 27 are able to contract the terminals 23 and 24. The length of the rod section 26a of the rivet 26 is defined by the thickness of the outer member 7 subtracted from the above-described cumulative thickness. Consequently, the length of the rod section 26a can be shortened and the cost for manufacturing the rivets 26 can be reduced. Further, the operation of inserting the rod section 26a into the bores 9b, 6b, 23b (or 24b), 7b and 27b becomes simpler. Consequently, the work efficiency can be improved.

Figure 14:
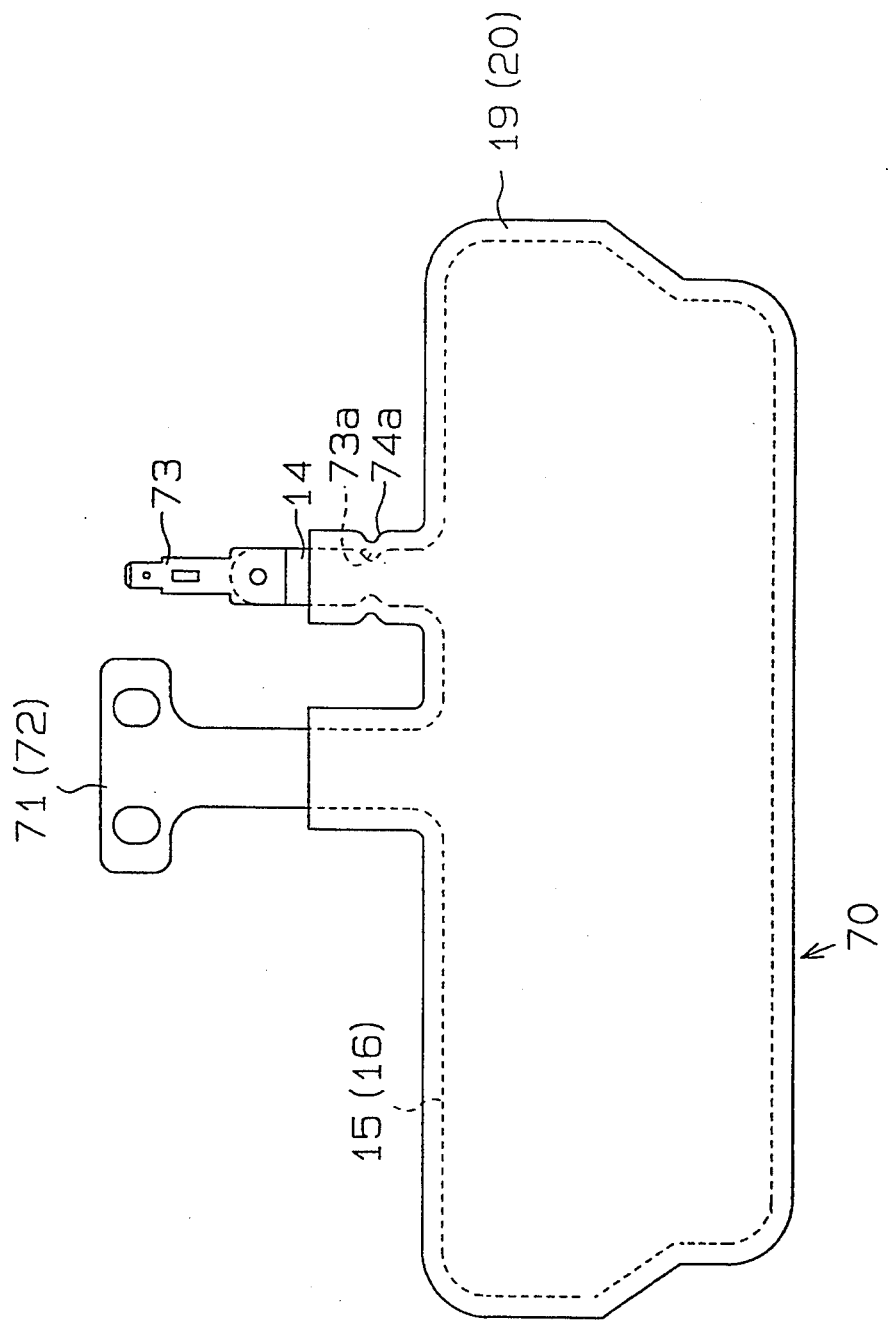
FIG. 14 is a plan view of a horn switch of another embodiment of the present invention.
Figure 15:
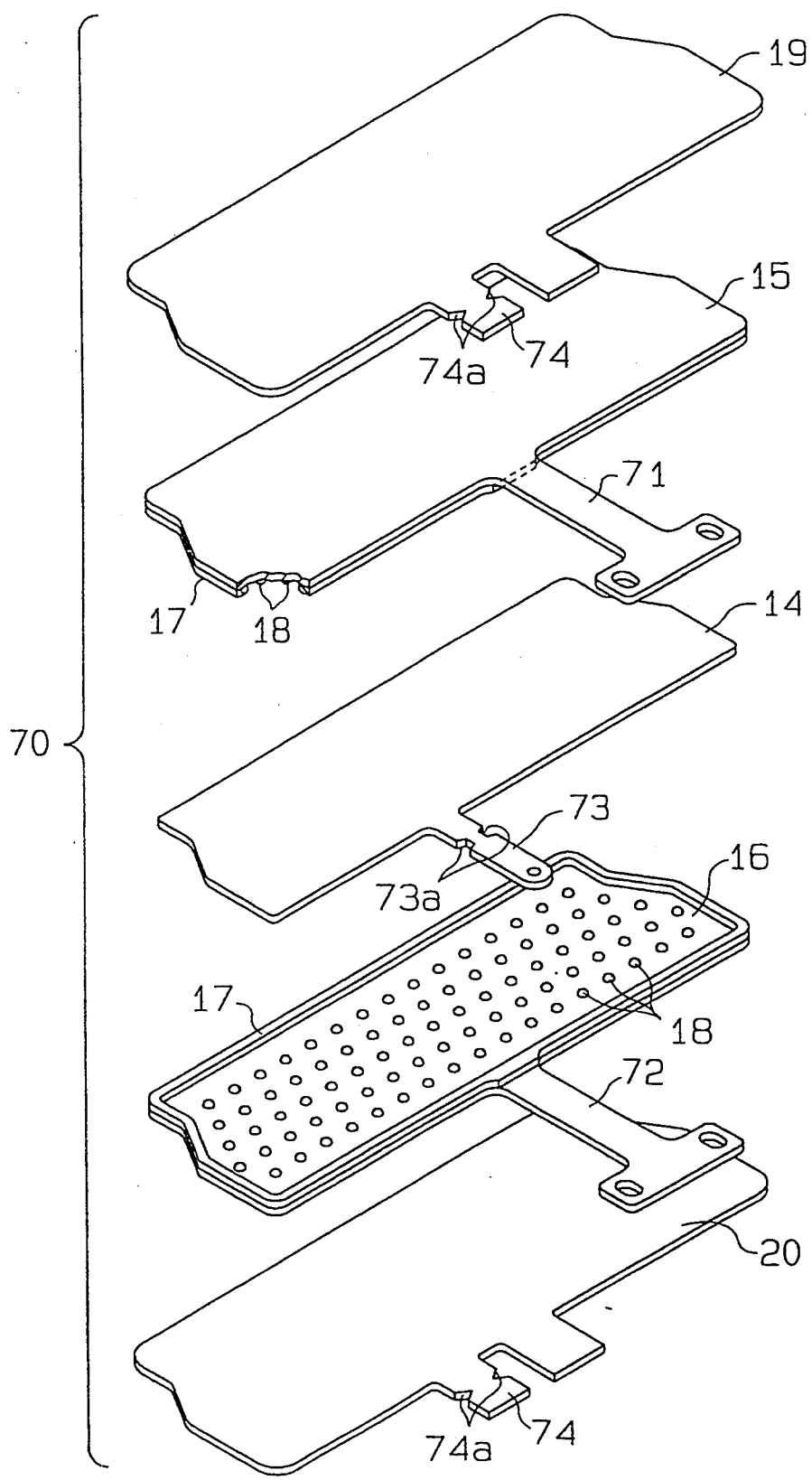
FIG. 15 is a perspective view of the disassembled horn switch of FIG. 14.

A second embodiment of a horn switch will now be described with reference to FIGS. 14 and 15. Only the terminal structure of a horn switch differs from the horn switch of the first embodiment. The first and second contact plates 15 and 16 have the same configurations. Terminals 71 and 72 are formed at the side edges of the first and second contact plates 15 and 16 so as to protrude therefrom, respectively, and which overlap each other. A base plate terminal 74 is formed at the side edge of the base plate 14, which protrudes therefrom in a substantially parallel relation to the terminals 71 and 72. The terminals 73 and 72 are connected to the air bag device D, and the base plate terminal 73 is connected to the horn device (not shown).

Opposing notches 73a are formed at the proximal end of the base plate terminal 73. Opposing notches 74a are formed at portions 74 of the films 19 and 20 which partially cover the proximal end of the base plate terminals 73. Therefore, the base plate terminal 73 and the films 19 and 20 are broken down at the notches 73a and 74a, when pressure is applied to the horn switch 70 according to the inflation of the air bag. Accordingly, the electrical connection between the horn switch and the horn device is cut-off. Even if the air bag device is activated during operation of the horn device, the operation of the horn device can be stopped.

Although only a few embodiments of the present invention have been described herein, it should be apparent to those skilled in the art that the present invention may be embodied in many other specific forms without departing from the spirit or scope of the invention. Particularly, it should be understood that following modification may be applied.

1) The outer member 7 can be made of soft material, such as soft vinyl chloride resin, and TPU, etc., in place of thermoplastic elastomer.

2) The number or locations of the positioning lugs 31 and the guide lugs 32 can be changed. Further, the shapes of the holes 33 and posts 36 can be alternated, and the number of the notches 34 of the hole 33 can be changed.

Therefore, the present examples and embodiments are to be considered as illustrative and not restrictive, and the invention is not to be limited to the details giving herein, but may be modified in accordance with the scope of the appended claims.

What is claimed is:

1. A steering wheel pad comprising:
a non-conductive inner member;
a pressure sensitive horn switch disposed on top of the inner member, the horn switch having terminals;
a non-conductive outer member covering surfaces of the inner member and the horn switch;
an air bag device disposed in a space defined by surfaces of the inner member;
a conductive bag support for attaching the air bag device to the inner member;
a conductive bracket; and
a conductive coupling member,
said conductive bracket being disposed at an outer side of the outer member, the conductive coupling member coupling the conductive bag support, inner member, terminals, outer member and conductive bracket together, thereby electrically connecting the conductive bracket to the terminals.

2. The steering wheel pad according to claim 1, wherein the conductive coupling member includes a rod portion and engaging portions at opposing ends of the rod portion, said rod portion being inserted into bores of the support, inner member, terminals, outer member and conductive bracket, said engaging sections contacting the conductive bag support and conductive bracket.

3. The steering wheel pad according to claim 1, wherein the outer member is made of soft synthetic resin.

4. The steering wheel pad according to claim 3, wherein the outer member has a plurality of ribs that abut the horn switch.

5. The steering wheel pad according to claim 1, wherein the horn switch has a switch body that includes a conductive base plate and a pair of conductive contact plates disposed on opposing surfaces of the base plate, one of the contact plates contacting the base plate to form an electrical connection when the switch body is depressed.

6. The steering wheel pad according to claim 1, wherein the air bag device includes an inflator fixed to the inner member by the bag support, an air bag being accommodated between the inflator and the inner member in a folded state, the air bag being inflated by nitrogen gas generated within the inflator.

7. The steering wheel pad according to claim 6, wherein the inner member is made of rigid synthetic resin, the inner member having a plurality of notches, said notches permitting breaking of the inner member when the air bag is inflated.

8. The steering wheel pad according to claim 2, wherein the conductive bracket has a projection protruded toward the outer member, the projection being accommodated in a bore of the outer member, an outer periphery of the projection contacting an outer surface of the outer member, the rod portion of the conductive coupling member being coupled with the projection.

9. The steering wheel pad according to claim 1, wherein one of the inner member and the horn switch includes a positioning post, the post engaging a bore of the other of the inner member and the horn switch to align the inner member and the horn switch.

10. The steering wheel pad according to claim 9, wherein the post has a non-circular cross-section.

11. The steering wheel pad according to claim 9, wherein a cross-sectional area of the post is larger than an opening area of the bore, and a plurality of notches are formed around the bore to enlarge the opening area of the bore during engagement with the post.

12. The steering wheel pad according to claim 5, wherein the inner member has a plurality of positioning sections which engage the horn switch to position the switch body.

13. The steering wheel pad according to claim 5, wherein non-conductive spacers are provided between each of the contact plates and the base plate.

14. The steering wheel pad according to claim 13, wherein the spacers include a belt-shaped spacer disposed on an outer periphery of the base plate, and a plurality of pellet shaped spacers disposed at upper and lower sides of the base plate in a middle portion thereof, arrangements of the pellet shaped spacers disposed at the upper and lower sides of the base plate being different from each other.

15. A steering wheel pad comprising:
a non-conductive inner member;
a pressure sensitive horn switch disposed on top of the inner member, the horn switch having terminals and a switch body;
the inner member having a plurality of positioning sections for engaging the horn switch to position the switch body;
a non-conductive outer member covering surfaces of the inner member and the horn switch;
an air bag device disposed in a space defined by surfaces of the inner member;
a conductive bag support for attaching the air bag device to the inner member;
a conductive bracket having a projection protruded toward an outer portion thereof; and
a conductive coupling member;
the projection of the conductive bracket being housed in a bore provided in the outer member, an outer periphery of the projection contacting with an outer surface of the outer member, the horn switch being positioned on the inner member by the positioning sections, the conductive coupling member coupling the conductive bag support, inner member, terminals, outer member and conductive bracket, thereby electrically connecting the conductive bracket to the terminals.

16. The steering wheel pad according to claim 15, wherein the conductive coupling member includes a rod portion and engaging portions at opposing ends of the rod portion, the rod portion being inserted into bores of the support, inner member, terminals, outer member and conductive bracket, the engaging sections contacting the conductive bag support and bracket.

17. The steering wheel pad according to claim 15, wherein one of the inner member and the horn switch includes a positioning post, the post engaging a bore of the other of the inner member and the horn switch to align the inner member and the horn switch.

18. The steering wheel pad according to claim 17, wherein the post has a non-circular cross-section.

19. The steering wheel pad according to claim 17, wherein a cross-sectional area of the pad is larger than an opening area of the bore, and a plurality of notches are formed around the bore to enlarge the opening area of the bore during engagement with the post.

* * * * *